(12) United States Patent
Xu et al.

(10) Patent No.: US 12,008,480 B2
(45) Date of Patent: Jun. 11, 2024

(54) CONTEXT INFORMATION UNCERTAINTY ELIMINATION SYSTEM AND WORKING METHOD BASED ON QoX ADAPTIVE MANAGEMENT

(71) Applicant: SHAN DONG UNIVERSITY, Jinan (CN)

(72) Inventors: Hongji Xu, Jinan (CN); Hui Yuan, Jinan (CN); Yang Yang, Jinan (CN); Qiang Liu, Jinan (CN); Shidi Fan, Jinan (CN); Xiaojie Sun, Jinan (CN); Juan Li, Jinan (CN); Lingling Pan, Jinan (CN); Min Chen, Jinan (CN); Baozhen Du, Jinan (CN)

(73) Assignee: SHAN DONG UNIVERSITY, Jinan (CN)

( * ) Notice: Subject to any disclaimer, the term of this patent is extended or adjusted under 35 U.S.C. 154(b) by 800 days.

(21) Appl. No.: 16/980,406

(22) PCT Filed: Mar. 23, 2019

(86) PCT No.: PCT/CN2019/079385
§ 371 (c)(1),
(2) Date: Sep. 13, 2020

(87) PCT Pub. No.: WO2020/001094
PCT Pub. Date: Jan. 2, 2020

(65) Prior Publication Data
US 2021/0365811 A1 Nov. 25, 2021

(30) Foreign Application Priority Data
Jun. 25, 2018 (CN) .................. 201810659330.X (51) Int. Cl.
*G06N 5/04* (2023.01)
*G06N 5/022* (2023.01)

(52) U.S. Cl.
CPC ............... *G06N 5/04* (2013.01); *G06N 5/022* (2013.01)

(58) Field of Classification Search
CPC ............ G06N 5/022; G06N 5/04; G06N 5/02; G06N 3/084
See application file for complete search history.

(56) References Cited

U.S. PATENT DOCUMENTS

| | | | |
|---|---|---|---|
| 10,908,602 B2* | 2/2021 | Cella | G05B 19/41865 |
| 11,388,040 B2* | 7/2022 | Mdini | H04L 41/069 |
| 2015/0235143 A1* | 8/2015 | Eder | G16Z 99/00 |
| | | | 706/12 |

* cited by examiner

*Primary Examiner* — An H Do
(74) *Attorney, Agent, or Firm* — CBM PATENT CONSULTING, LLC (57) ABSTRACT

The invention relates to a QoX adaptive management-based context information uncertainty elimination system and a working method thereof. The system includes a sensor module, a context information acquisition and modeling module, a context threshold information preset module, an original context information detection module, an adaptive management module, an uncertainty elimination module, a context information correlation analysis module, an original context information flow reconstruction module, a composite context information flow module, a fusion and reasoning module, a context application layer adjustment module and a knowledge base.

10 Claims, 3 Drawing Sheets

CONTEXT INFORMATION UNCERTAINTY ELIMINATION SYSTEM AND WORKING METHOD BASED ON QoX ADAPTIVE MANAGEMENT

CROSS-REFERENCE TO RELATED PATENT APPLICATIONS

This application is based upon and claims priority to Chinese Patent Application No. 201810659330.X, filed on 25 Jun. 2018, the entire contents of which are incorporated herein by reference.

FIELD OF THE INVENTION

The invention generally relates to a quality of comprehensive indexes (QoX) adaptive management-based uncertainty elimination system of context information and a working method thereof and belongs to the technical field of context awareness.

BACKGROUND OF THE INVENTION

With the improvement of wireless sensor technology, human-computer interaction technology and intelligent computing technology, the context-aware technology has been developed rapidly, and the context-aware systems can be integrated into people's daily lives. The context-aware systems are human-centered computing systems, in which sensing devices can automatically perceive context information and changes of context information, and provide users with services related to the current environment and condition.

In heterogeneous context-aware networks, on the one hand, due to the existence of a large number of repetitive or similar sensors, the coexistence of multiple heterogeneous context-aware networks and the overlap and crossover of sensing areas, the context information collected by sensing networks often contains a large number of redundant data, using unprocessed context information directly will reduce the efficiency of computing resources and increase unnecessary costs. On the other hand, the multi-source context information collected by heterogeneous context-aware networks often has uncertainty problems such as incompleteness, inaccuracy and inconsistency, if a reasonable context information uncertainty elimination mechanism is not established, direct uncertainty elimination for multi-source context information may cause the context-aware systems to make inappropriate reasoning decisions, and then affects the quality of systems' services and users' satisfaction.

At present, for three types of uncertainty problems, i.e., inconsistency, incompleteness and inaccuracy of context information, some decentralized and independent, simple and fixed, and single model processing mechanisms are mostly adopted, which do not effectively combine various quality indexes with the context information uncertainty elimination system, and cannot well meet the dynamic requirements of complex and changeable uncertainty context information processing in heterogeneous context-aware networks. Therefore, how to realize dynamic adaptive processing of context information uncertainty is a key problem that need to be studied.

SUMMARY

In view of the shortcomings of existing technologies, the present invention provides a context information uncertainty elimination system based on QoX adaptive management in heterogeneous context-aware networks.

The invention also provides a working method of the above system.

The system utilizes the hierarchical comprehensive quality index QoX (It is the combination of several important quality indexes, i.e., Quality of Device (QoD), Quality of Context (QoC), Quality of Service (QoS) and Quality of Experience (QoE)) and error correction mechanism in the context application layer adjustment module, fully improves the credibility of the context-aware system through calculation, analyses and management of various quality of context indexes, provides an effective method for the context information uncertainty elimination in context-aware computing and makes the system has better initiative, fault tolerance and adaptability.

Terminology Explanation

Inconsistency rate refers to the proportion of inconsistency data in a certain type of context information sample vector in the context-aware system.

Incompleteness rate refers to the proportion of missing data in a certain type of context information sample vector in the context-aware system.

Inaccuracy rate refers to the proportion of imprecise data in a certain type of context information sample vector in the context-aware system.

Credibility refers to the accuracy of a particular context information, which is mainly affected by two factors, i.e., the precision of sensor and the physical spatial distance between the sensor and the target sensing entity. The farther the sensor is from its sensing entity, the lower credibility the sensing context information has.

Technical Solution of the Present Invention

A context information uncertainty elimination system based on QoX adaptive management in heterogeneous context-aware networks. The system comprises a sensor module, a context information acquisition and modeling module, a context information threshold information preset module, an original context information detection module, an adaptive management module, an uncertainty elimination module, a context information correlation analysis module, an original context information flow reconstruction module, a compound context information flow module, a fusion and reasoning module, a context application layer adjustment module and a knowledge base.

The sensor module, the context information acquisition and modeling module, the original context information detection module, the adaptive management module, the uncertainty elimination module, the context information correlation analysis module, the compound context information flow module, the fusion and reasoning module, the knowledge base and the context application layer adjustment module are connected in turn; the context information threshold information preset module, the original context information detection module and the adaptive management module are connected in turn from beginning to end; the adaptive management module, the uncertainty elimination module, the original context information flow reconstruction module (context information correlation analysis) and the compound context information flow module are connected in turn from beginning to end; the knowledge base is connected to the context application layer adjustment module.

The sensor module is related to the QoD and utilized to collect context information. The context information mainly refers to any information that can be used to characterize the situation of an entity that is considered relevant to the interaction between a user and an application.

The context information acquisition and modeling module is utilized to acquire context information and model the acquired context information according to the preset initial modeling method for obtaining original context information. This module is related to the QoD.

The preset initial modeling method is "context-aware type+context-aware information+context-aware accuracy", context-aware type is used for information classification, context-aware information refers to the original context information collected by sensors and context-aware accuracy is used for information processing. Through three closely related modeling sub-items, the reliability of context information uncertainty elimination in the context-aware system is improved.

The original context information detection module detects and quantifies the uncertainty of context information by calculating QoC indexes such as inconsistency rate, incompleteness rate, inaccuracy rate and timeliness, and combines the acceptance and rejection QoC threshold information preset by system to obtain the original context information flow that meets the requirements of system's accuracy rate and QoC indexes such as inconsistency rate, incompleteness rate, inaccuracy rate and timeliness. This module is related to the QoC.

The adaptive management module combines quality indexes of original context information, degree of relevance and feedback information of context information to evaluate the elimination priority level of each uncertainty factor of context information, and adaptively selects different elimination algorithms for a certain uncertainty problem in different situations, where quality indexes of original context information refer to inconsistency rate, incompleteness rate, inaccuracy rate and timeliness of the context information transmitted from the original context information detection module; degree of relevance refers to the correlation between the context information collected by each sensor in the sensor module and final judgment results; feedback information of context information comprises the user feedback information and the context information after context subscription and error correction. For the elimination priority level of uncertainty factors, the adopted principle is firstly to eliminate main contradiction, consider special circumstances into consideration and adopt a real-time feedback mechanism. This module is related to the QoX.

The uncertainty elimination module is used for analyzing original context information, and eliminating uncertainty data of original context information according to the elimination priority level of each uncertainty factor obtained from the adaptive management module and appropriate elimination algorithms for an uncertainty problem in different situations. This module is related to the QoX.

The knowledge base is related to the QoX and used to store the context information after fusion and reasoning, the information after context subscription information correction and user feedback information; meanwhile, the knowledge base provides context information modeling methods for the context information acquisition and modeling module, and adjusts context information acquisition threshold at the same time. It also provides feedback information and degree of relevance information between context information for the adaptive management module, and provides suitable fusion and reasoning mechanisms for the fusion and reasoning module.

The fusion and reasoning module is related to the QoS and utilized to combine the data processed by the uncertainty elimination module, complete information flow reconstruction of original context information, analyze the correlation of context information and finally build information flow of compound context information with accurate data, clear structure and rich meaning; information flow of compound context information is fused and reasoned into the high-level context information that can be recognized by applications and smart devices through utilizing context information fusion and reasoning technologies, and then the high-level context information will be stored in the knowledge base; applications and smart devices make adaptive adjustments according to the high-level context information so as to improve users' comprehensive quality level of experience in the context-aware system.

The context application layer adjustment module is used to adjust the operating statuses of programs or devices in real time according to user feedback or context subscription, and to update the historical context information in the knowledge base. This module is related to the QoS.

The context information threshold information preset module is related to the QoC and utilized to preset the discarding threshold of context information.

The context information correlation analysis module is adopted to analyze the degree of relevance between context information.

The original context information flow reconstruction module is used to reintegrate original context information flow.

The compound context information flow module is utilized to reorganize context information based on the degree of relevance between context information, as well as the original context information after reconstruction.

The context information uncertainty elimination system further comprises a transmission control module, a priority control module, an adaptive control module and a system access control module.

The transmission control module is used to control the flow direction of original context information and quality of context information. This module is related to the QoC.

The priority control module is related to the QoX and used to control the priority for the elimination of various context information uncertainty problems.

The adaptive control module is related to the QoX and utilized to adjust context information uncertainty elimination mechanism in real time.

The system access control module is related to the QoS and used to control users' access range.

The original context information detection module comprises a context information inconsistency detection/quantization unit, a context information inaccuracy detection/quantization unit and a context information incompleteness detection/quantization unit.

The context information inconsistency detection/quantification unit is used to detect inconsistency and determine inconsistency rate. For example, four sensors are utilized to collect user's identity information for personal identity verification (PIV), assume that the collected context information at the same time is "0", "1", "1", "1", "0", and "0", respectively, where status "0" represents recognition failed and status "1" represents identification succeeded, so the inconsistency rate at the same time is equal to 50%.

The context information inaccuracy detection/quantization unit is used to detect inaccuracy and determine inaccuracy rate. The context information inaccuracy can be quantified by statistical parameters such as mean value and variance.

The context information incompleteness detection/quantification unit is utilized to detect incompleteness of context information and determine incompleteness rate. For example, the number of the context information collected by the sensor S1 is 30 in a certain period of time, however, the number of the missing context information is 15, so the incompleteness rate equals 50%.

The uncertainty elimination module comprises an inconsistency elimination unit, an incompleteness elimination unit and an inaccuracy elimination unit.

The inconsistency elimination unit eliminates inconsistency of context information according to the algorithms given by the adaptive management module.

The incompleteness elimination unit eliminates incompleteness of context information according to the algorithms given by the adaptive management module.

The inaccuracy elimination unit eliminates inaccuracy of context information according to the algorithms given by the adaptive management module.

The adaptive management module comprises a credibility reliability unit, a degree of relevance evaluation unit, an incompleteness rate at the same time unit and an uncertainty level unit.

The credibility reliability unit is utilized to calculate the credibility and reliability of context information.

The degree of relevance evaluation unit is utilized to evaluate the degree of relevance between context information and context information, as well as which between context information and final judgment results.

The incompleteness rate at the same time unit is utilized to judge the magnitude of incompleteness rate, inconsistency rate and inaccuracy rate of context information at the same time.

The uncertainty level unit is utilized to evaluate the severity of uncertainty problems of various context information based on above indexes.

The context application layer adjustment module comprises a user feedback unit, a context application unit, a context subscription unit and an error correction unit.

The knowledge base, the context application unit, the context subscription unit and the error correction unit are connected in turn from beginning to end; the user feedback unit is connected to the knowledge base.

The user feedback unit is used to store user feedback information.

The context application unit is used to control the operating statuses of applications or devices.

The context subscription unit is used to subscribe required context information based on users' current statuses.

The error correction unit is used to correct historical context information in the knowledge base based on subscription context information.

The working method of above context information uncertainty elimination system comprises the following steps:

(1) Initial setting subsystem is responsible for setting initial parameters of the context information uncertainty elimination system, and the steps are as follows:

S11: Through the user feedback unit, users perform initial setting operations of the context-aware system based on the types, quantities and structures of the collected context information, and the initial setting information is sent to the knowledge base. The initial setting information contains context information modeling method, context information discarding threshold, uncertainty elimination priority level, uncertainty elimination algorithms and context information fusion and reasoning rules, for example, the modeling mode "context-aware type+context-aware information+context-aware accuracy" is adopted, if the inconsistency rate exceeds 30%, the corresponding context information will be discarded. After that, firstly eliminate the incompleteness, then eliminate the inaccuracy, and finally eliminate the inconsistency. Choose different uncertainty elimination algorithms, adopt the voting method to eliminate the inconsistency and adopt reasoning rules based on degree of relevance.

S12: The knowledge base stores users' initial setting information for the context-aware system in the user feedback unit as well as the useful historical information, and sends relevant information to the context information acquisition and modeling module, the original context information detection module, the adaptive management module, the uncertainty elimination module and the fusion and reasoning module; relevant information contains the modeling methods preset by users or systems, the context information discarding threshold, the context information uncertainty elimination mechanism and the context information fusion and reasoning rules.

S13: The context information acquisition and modeling module, the original context information detection module, the adaptive management module, the uncertainty elimination module and the fusion and reasoning module adjust their operations based on the relevant information obtained from the knowledge base; relevant information contains the modeling methods preset by users or systems, the context information discarding threshold, the context information uncertainty elimination mechanism and the context information fusion and reasoning rules.

The context triggering subsystem mainly comprises the context information acquisition and modeling module, the original context information detection module, the adaptive management module, the uncertainty elimination module, the original context information flow reconstruction module, the fusion and reasoning module, the context application layer adjustment module and the knowledge base, etc. The context triggering subsystem is responsible for realizing the context-aware tasks of context information and dynamic adjustment function in the context-aware system.

(2) The context triggering subsystem comprises the following steps:

S21: The context information acquisition and modeling module obtains context information, models according to the preset context information modeling method, and sends it to the original context information detection module.

Further preferably, the context information acquisition and modeling module obtains context information, if context information exceeds the context information discarding threshold, it will be discarded, otherwise, it will be modeled based on the preset context information modeling method and then sent to the original context information detection module, the modeling method is "context-aware type+context-aware information+context-aware accuracy", various types of acquired context information need to be modeled according to the preset model in the knowledge base to realize the standardization of the context information description, so as to further process context information in the later period for realizing the operations between context information of different fields.

S22: The original context information detection module detects whether the context information from the context information acquisition and modeling module has incompleteness, inaccuracy and inconsistency, calculates incompleteness rate, inaccuracy rate, inconsistency rate, degree of relevance, timeliness and reliability, respectively, and filters based on the context information discarding threshold preset by users in the knowledge base. The context information which meets requirements is transmitted to the uncertainty elimination module; the quality of context information is transmitted to the adaptive management module at the same time, which contains inconsistency rate, incompleteness rate, inaccuracy rate, and degree of relevance.

S23: The adaptive management module further formulates context information uncertainty elimination strategy based on the quality of context information from the original context information detection module, the context information uncertainty elimination strategy comprises which uncertainty factor is eliminated firstly and which algorithms are utilized to eliminate each uncertainty factor.

Further preferably, the strategy of context information uncertainty elimination is firstly eliminating main contradiction, and then eliminating minor contradiction. Of course, special analyses will be carried out in case of special circumstances.

S24: Based on the context information from the original context information detection module and the uncertainty elimination strategy from the adaptive management module, the uncertainty elimination module eliminates the uncertainty of context information.

Further preferably, when inconsistency of context information is eliminated, the voting algorithm, the trustworthiness-based algorithm and the Dempster-Shafer (D-S) evidence theory algorithm are adopted; when incompleteness of context information is eliminated, the mean and expectation maximization (EM) algorithm is adopted. For a certain type of uncertainty factor, such as inconsistency, when the severity of inconsistency is different, the inconsistency elimination strategy will be adjusted accordingly.

S25: Through the fusion and reasoning module, low-level context information and useful historical context information in the knowledge base are fused and reasoned into the high-level context information that can be recognized by the context application layer adjustment module, which is stored in the knowledge base as well.

S26: The knowledge base stores real-time data and the high-level context information reasoned by the fusion and reasoning module.

S27: The context application layer adjustment module makes appropriate responses based on the user feedback information and various context information from the knowledge base; for example, reminding users to reduce the amount of exercise appropriately.

(3) The context subscription subsystem is responsible for completing tasks of context information subscription in the context-aware system. The steps are as follows:

S31: Starting from the requirements of context-aware applications, the context subscription unit sets up required context subscription mechanism and sends subscribed context information to the error correction unit.

S32: The error correction unit obtains correct context information based on the comparative analyses between received context subscription unit and corresponding part of context information in the knowledge base, and converts correct context information into a format that can be recognized by the knowledge base and transmits it to the knowledge base.

S33: The knowledge base adjusts the corresponding context information in the knowledge base based on the context subscription information sent by the error correction unit, and sends the adjustment information to the context information acquisition and modeling module to adjust and correct relevant context information periodically. Through the context acquisition and modeling module, the original context information detection module, the adaptive management module, the uncertainty elimination module and the fusion and reasoning module, this low-level context information is finally transformed into the high-level context information, which is stored in the knowledge base and sent to the context application unit.

S34: The context application unit further adjusts its operations according to context subscription information.

S35: The context information acquisition and modeling module, the original context information detection module, the adaptive management module, the uncertainty elimination module, the fusion and reasoning module and the context application layer adjustment module adjust their operations according to the relevant adjustment information in the knowledge base.

(4) The user feedback subsystem is responsible for completing adjustment tasks of user feedback in the context-aware system. The steps are as follows:

S41: The user feedback unit receives user feedback information and adjustment information.

S42: The context application unit adjusts its own tasks according to the feedback information from the user feedback unit, and adjusts the operations that cannot meet the users' expectation.

S43: The knowledge base stores user feedback information, and adjusts its own stored context information based on feedback information, and then sends this information to the context information acquisition and modeling module, the original context information detection module, the adaptive management module, the uncertainty elimination module, the fusion and reasoning module and the context subscription unit.

S44: The context information acquisition and modeling module, the original context information detection module, the adaptive management module, the uncertainty elimination module, the fusion and reasoning module and the context application layer adjustment module appropriately adjust their preset information and related operations respectively according to the context information from the knowledge base.

(5) The adaptive management subsystem comprises the following steps:

S51: The adaptive management module receives information related to the quality of information from the original context information detection module such as incompleteness rate, inaccuracy rate, inconsistency rate, membership degree and accuracy of context information.

S52: The adaptive management module analyzes the quality information of context from the original context information detection module and transmits the analysis results to the uncertainty elimination module, and the main content of the analyses contains the priority of uncertainty elimination and which algorithms to use in an uncertain situation.

S53: The context information after a series of processing is stored in the knowledge base which also comprises user feedback information and context subscription information. The quality information of context information in the knowledge base will be fed back to the adaptive management module.

S54: After the further adjustment of knowledge base feedback information, the adaptive management module will make adjustments to the threshold information of the original context information detection module, processing mechanism and algorithm selection of the uncertainty elimination module.

The step S54 comprises the following steps: when the quality of context information still fails to meet the system requirements after a series of processing, the knowledge base sends adjustment information to the adaptive management module, and the adaptive management module will make adjustments according to the current quality of information and the feedback information from the knowledge base.

The present invention comprises the following outstanding advantages:

(1) Initiative. The framework of the system can actively identify all kinds of context information, monitor changes of environmental status in real time, and actively serve users through the processing of various context information.

(2) Adaptability. The system can realize adaptive adjustment of applications or devices by integrating various quality indexes into the context information uncertainty elimination system, as well as the user feedback of the context application layer adjustment module and the error correction mechanism.

(3) Fault tolerance. It can be known that the uncertainty elimination system based on various quality indexes has better fault tolerance performance than traditional context-aware systems through system simulation analyses.

DETAILED DESCRIPTION OF THE EMBODIMENTS

The following embodiments and accompanying drawings clearly and completely describe technical solutions of the present invention. Obviously, specific embodiments described are only used to explain the present invention, rather than limiting the present invention.

Embodiment 1

Figure 1:
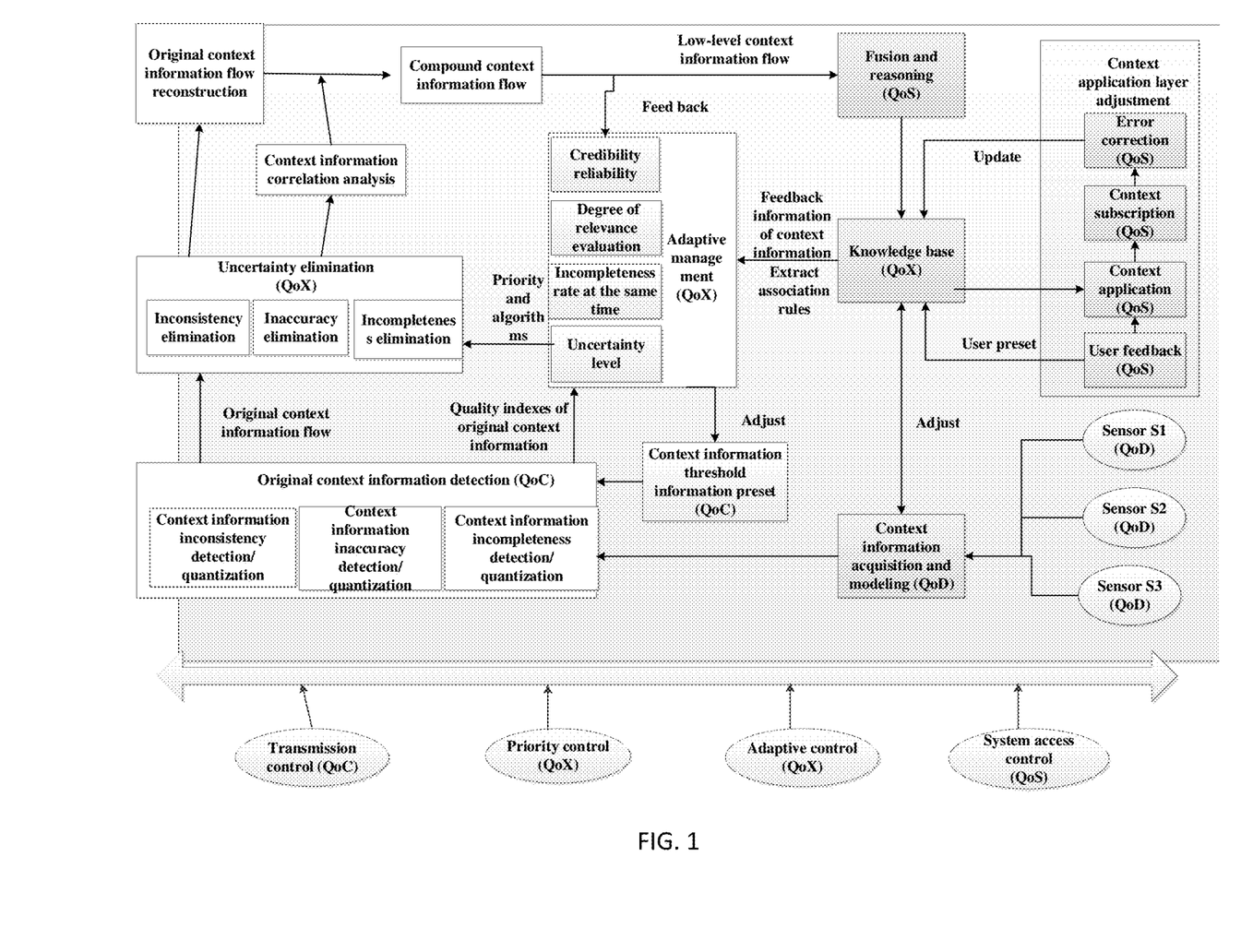
FIG. 1 is a structural block diagram of a context information uncertainty elimination system based on QoX adaptive management in heterogeneous context-aware networks of the present invention.

As shown in FIG. 1, a context information uncertainty elimination system based on QoX adaptive management in heterogeneous context-aware networks comprises a sensor module, a context information acquisition and modeling module, a context information threshold information preset module, an original context information detection module, an adaptive management module, an uncertainty elimination module, a context information correlation analysis module, an original context information flow reconstruction module, a compound context information flow module, a fusion and reasoning module, a context application layer adjustment module and a knowledge base.

The sensor module, the context information acquisition and modeling module, the original context information detection module, the adaptive management module, the uncertainty elimination module, the context information correlation analysis module, the compound context information flow module, the fusion and reasoning module, the knowledge base and the context application layer adjustment module are connected in turn; the context information threshold information preset module, the original context information detection module and the adaptive management module are connected in turn from beginning to end; the adaptive management module, the uncertainty elimination module, the original context information flow reconstruction module and the compound context information flow module are connected in turn from beginning to end; the knowledge base is connected to the context application layer adjustment module. The sensor module contains sensor S1, sensor S2, and sensor S3.

The sensor module is used to collect context information. The context information mainly refers to any information that can be used to characterize the situation of an entity that is considered relevant to the interaction between a user and an application.

The preset initial modeling method is "context-aware type+context-aware information+context-aware accuracy", context-aware type is used for information classification, context-aware information refers to the original context information collected by sensors and context-aware accuracy is used for information processing. Through three closely related modeling sub-items, the reliability of context information uncertainty elimination in the context-aware system is improved.

The original context information detection module detects and quantifies the uncertainty of context information by calculating QoC indexes such as inconsistency rate, incompleteness rate, inaccuracy rate and timeliness, and combines the acceptance and rejection QoC threshold information preset by system to obtain the original context information flow that meets the requirements of system's accuracy rate and QoC indexes such as inconsistency rate, incompleteness rate, inaccuracy rate and timeliness.

The adaptive management module combines quality indexes of original context information, degree of relevance and feedback information of context information to evaluate the elimination priority level of each uncertainty factor of context information, and adaptively selects different elimination algorithms for a certain uncertainty problem in different situations, where quality indexes of original context information refer to inconsistency rate, incompleteness rate, inaccuracy rate and timeliness of the context information transmitted from the original context information detection module; degree of relevance refers to the correlation between the context information collected by each sensor in the sensor module and final judgment results; feedback information of context information comprises the user feedback information and the context information after context subscription and error correction. For the elimination priority level of uncertainty factors, the adopted principle is firstly to eliminate main contradiction, consider special circumstances into consideration and adopt a real-time feedback mechanism; for example, when inconsistency of multi-source context information within a certain period of time is the main contradiction, inconsistency should be firstly eliminated in theory, however, if there exists much incomplete information from each information source at a certain time, the priority will be given for incompleteness elimination, meanwhile, according to the feedback information after uncertainty elimination and the feedback information related to QoE such as user satisfaction and context subscription information in the knowledge base, the uncertainty elimination priority is appropriately adjusted, the uncertainty of the entire system is finally realized closed-loop adaptive processing dynamically. In addition, QoD information of sensors can be appropriately adjusted according to various types of QoX information in the adaptive management module, such as distance between sensors and acquisition target, as well as acquisition frequency of sensors.

The uncertainty elimination module is used for analyzing original context information, and eliminating uncertainty data of original context information according to the elimination priority level of each uncertainty factor obtained from the adaptive management module and appropriate elimination algorithms for an uncertainty problem in different situations, for example, for incomplete and inaccurate context information, back propagation (BP) artificial neural networks and EM algorithm are used for processing, while inconsistency can be solved by using context information inconsistency elimination algorithm based on improved D-S evidence theory.

The knowledge base is used to store the context information after fusion and reasoning, the information after context subscription information correction and user feedback information; meanwhile, the knowledge base provides context information modeling methods for the context information acquisition and modeling module, and adjusts context information acquisition threshold at the same time. It also provides feedback information and degree of relevance information between context information for the adaptive management module, and provides suitable fusion and reasoning mechanisms for the fusion and reasoning module.

The fusion and reasoning module is utilized to combine the data processed by the uncertainty elimination module, complete information flow reconstruction of original context information, analyze the correlation of context information and finally build information flow of compound context information with accurate data, clear structure and rich meaning; information flow of compound context information is fused and reasoned into the high-level context information that can be recognized by applications and smart devices through utilizing context information fusion and reasoning technologies, and then the high-level context information will be stored in the knowledge base; applications and smart devices make adaptive adjustments according to the high-level context information so as to improve users' comprehensive quality level of experience in the context-aware system.

The context application layer adjustment module is used to adjust the operating statuses of programs or devices in real time according to user feedback or context subscription, and to update the historical context information in the knowledge base.

The context information threshold information preset module is utilized to preset the discarding threshold of context information; the context information correlation analysis module is used to analyze the degree of relevance between context information; the original context information flow reconstruction module is used to reintegrate original context information flow; the compound context information flow module is utilized to reorganize context information based on the degree of relevance between context information, as well as the original context information after reconstruction.

The context information uncertainty elimination system further comprises a transmission control module, a priority control module, an adaptive control module and a system access control module. The transmission control module is used to control the flow direction of original context information and quality of context information; the priority control module is used to control the priority for the elimination of various context information uncertainty problems; the adaptive control module is utilized to adjust context information uncertainty elimination mechanism in real time; the system access control module is used to control users' access range.

The original context information detection module comprises a context information inconsistency detection/quantization unit, a context information inaccuracy detection/quantization unit and a context information incompleteness detection/quantization unit.

The context information inconsistency detection/quantification unit is used to detect inconsistency and determine inconsistency rate, for example, four sensors are utilized to collect user's identity information for PIV, assume that the collected context information at the same time is "0", "1", "1", "1", "0", and "0", respectively, where status "0" represents recognition failed and status "1" represents identification succeeded, so the inconsistency rate at the same time is equal to 50%; the context information inaccuracy detection/quantization unit is used to detect inaccuracy and determine inaccuracy rate, the context information inaccuracy can be quantified by statistical parameters such as mean value and variance; the context information incompleteness detection/quantification unit is utilized to detect incompleteness of context information and determine incompleteness rate, for example, the number of the context information collected by the sensor S1 is 30 in a certain period of time, however, the number of the missing context information is 15, so the incompleteness rate equals 50%.

The uncertainty elimination module comprises an inconsistency elimination unit, an incompleteness elimination unit and an inaccuracy elimination unit.

The inconsistency elimination unit eliminates inconsistency of context information according to the algorithms given by the adaptive management module; the incompleteness elimination unit eliminates incompleteness of context information according to the algorithms given by the adaptive management module; the inaccuracy elimination unit eliminates inaccuracy of context information according to the algorithms given by the adaptive management module.

The adaptive management module comprises a credibility reliability unit, a degree of relevance evaluation unit, an incompleteness rate at the same time unit and an uncertainty level unit.

The credibility reliability unit is utilized to calculate the credibility and reliability of context information; the degree of relevance evaluation unit is utilized to evaluate the degree of relevance between context information and context information, as well as which between context information and final judgment results; the incompleteness rate at the same time unit is utilized to judge the magnitude of incompleteness rate, inconsistency rate and inaccuracy rate of context information at the same time; the uncertainty level unit is utilized to evaluate the severity of uncertainty problems of various context information based on above indexes.

The context application layer adjustment module comprises a user feedback unit, a context application unit, a context subscription unit and an error correction unit.

The knowledge base, the context application unit, the context subscription unit and the error correction unit are connected in turn from beginning to end; the user feedback unit is connected to the knowledge base; the user feedback unit is used to store user feedback information; the context application unit is used to control the operating statuses of applications or devices; the context subscription unit is used to subscribe required context information based on users' current statuses; the error correction unit is used to correct historical context information in the knowledge base based on subscription context information.

Embodiment 2

Figure 2:
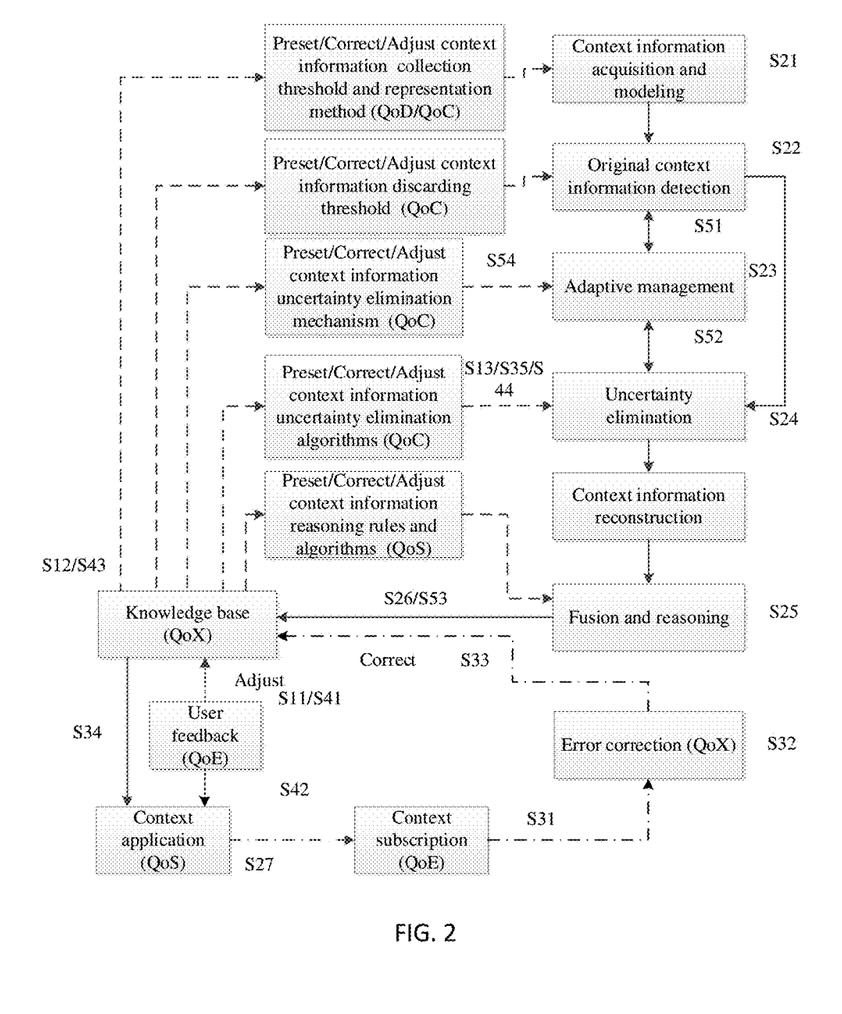
FIG. 2 is a working method flowchart of a context information uncertainty elimination system based on QoX adaptive management in heterogeneous context-aware networks of the present invention.

As shown in FIG. 2, the working method of context information uncertainty elimination system described in embodiment 1 can fully improve credibility of the context-aware system, provide an effective method for context information uncertainty elimination in context-aware computing so that the system has better initiative, fault tolerance and adaptability. Taking a typical scenario of context-aware computing—smart healthcare as an example, in smart healthcare, different sensors are used to collect context information such as blood pressure, blood oxygen, pulse and heart rate. The steps are as follows:

(1) Initial setting subsystem is responsible for setting initial parameters of the context information uncertainty elimination system, and the steps are as follows:

S11: Through the user feedback unit, users perform initial setting operations of the context-aware system based on the types, quantities and structures of the collected context information, and the initial setting information is sent to the knowledge base. The initial setting information contains context information modeling method, context information discarding threshold, uncertainty elimination priority level, uncertainty elimination algorithms and context information fusion and reasoning rules.

S12: The knowledge base stores users' initial setting information for the context-aware system in the user feedback unit as well as the useful historical information, and sends relevant information to the context information acquisition and modeling module, the original context information detection module, the adaptive management module, the uncertainty elimination module and the fusion and reasoning module.

S13: The context information acquisition and modeling module, the original context information detection module, the adaptive management module, the uncertainty elimination module and the fusion and reasoning module adjust their operations based on the relevant information obtained from the knowledge base; relevant information contains the modeling methods preset by users or systems, the context information discarding threshold, the context information uncertainty elimination mechanism and the context information fusion and reasoning rules.

(2) The context triggering subsystem comprises the following steps:

S21: The context information acquisition and modeling module obtains context information, models according to the preset context information modeling method, and sends it to the original context information detection module.

The context information acquisition and modeling module obtains context information, if context information exceeds the context information discarding threshold, it will be discarded, otherwise, it will be modeled based on the preset context information modeling method and then sent to the original context information detection module, the modeling method is "context-aware type+context-aware information+context-aware accuracy", various types of acquired context information need to be modeled according to the preset model in the knowledge base to realize the standardization of the context information description, so as to further process context information in the later period for realizing the operations between context information of different fields; for example, the acquired physical information is modeled as "context-aware type-pulse", "context-aware information-70", "context-aware timestamp-7:00".

S22: The original context information detection module detects whether the context information from the context information acquisition and modeling module has incompleteness, inaccuracy and inconsistency, calculates incompleteness rate, inaccuracy rate, inconsistency rate, degree of relevance, timeliness and reliability, respectively, and filters based on the context information discarding threshold preset by users in the knowledge base. The context information which meets requirements is transmitted to the uncertainty elimination module; the quality of context information is transmitted to the adaptive management module at the same time, which contains inconsistency rate, incompleteness rate, inaccuracy rate and degree of relevance; for example, when the inconsistency rate of the context information collected by a sensor is detected to be over 40%, the context information will be discarded and then collected again.

S23: The adaptive management module further formulates context information uncertainty elimination strategy based on the quality of context information from the original context information detection module, the context information uncertainty elimination strategy comprises which uncertainty factor is eliminated firstly and which algorithms are utilized to eliminate each uncertainty factor.

The strategy of context information uncertainty elimination is firstly eliminating main contradiction, and then eliminating minor contradiction. Of course, special analyses will be carried out in case of special circumstances. For example, when the pulse information is collected by three sensors at the same time, wherein the incompleteness, inaccuracy and inconsistency of context information in a certain period of time are 5%, 10% and 20%, respectively, the adaptive management module will adopt the strategy that firstly eliminating the inconsistency, and then the inaccuracy and incompleteness, of course, if two or more pieces of data are missing at a certain moment, the uncertainty elimination strategy is firstly eliminating incompleteness context information.

S24: Based on the context information from the original context information detection module and the uncertainty elimination strategy from the adaptive management module, the uncertainty elimination module eliminates the uncertainty of context information.

When inconsistency of context information is eliminated, the voting algorithm, the trustworthiness-based algorithm and the D-S evidence theory algorithm are adopted; when incompleteness of context information is eliminated, the EM algorithm is adopted. For a certain type of uncertainty factor, such as inconsistency, when the severity of inconsistency is different, the inconsistency elimination strategy will be adjusted accordingly.

S25: Through the fusion and reasoning module, low-level context information and useful historical context information in the knowledge base are fused and reasoned into the high-level context information that can be recognized by the context application layer adjustment module, which is stored in the knowledge base as well.

S26: The knowledge base stores real-time data and the high-level context information reasoned by the fusion and reasoning module.

S27: The context application layer adjustment module makes appropriate responses based on the user feedback information and various context information from the knowledge base; for example, reminding users to reduce the amount of exercise appropriately.

(3) The context subscription subsystem is responsible for completing tasks of context information subscription in the context-aware system. The steps are as follows:

S31: Starting from the requirements of context-aware applications, the context subscription unit sets up required context subscription mechanism and sends subscribed context information to the error correction unit.

S32: The error correction unit obtains correct context information based on the comparative analyses between received context subscription unit and corresponding part of context information in the knowledge base, and converts correct context information into a format that can be recognized by the knowledge base and transmits it to the knowledge base.

S33: The knowledge base adjusts the corresponding context information in the knowledge base based on the context subscription information sent by the error correction unit, and sends the adjustment information to the context information acquisition and modeling module to adjust and correct relevant context information periodically. Through the context acquisition and modeling module, the original context information detection module, the adaptive management module, the uncertainty elimination module and the fusion and reasoning module, this low-level context information is finally transformed into the high-level context information, which is stored in the knowledge base and sent to the context application unit.

S34: The context application unit further adjusts its operations according to context subscription information.

S35: The context information acquisition and modeling module, the original context information detection module, the adaptive management module, the uncertainty elimination module, the fusion and reasoning module and the context application layer adjustment module adjust their operations according to the relevant adjustment information in the knowledge base.

(4) The user feedback subsystem is responsible for completing adjustment tasks of user feedback in the context-aware system. The steps are as follows:

S41: The user feedback unit receives user feedback information and adjustment information.

S42: The context application unit adjusts its own tasks according to the feedback information from the user feedback unit, and adjusts the operations that cannot meet the users' expectation; for example, when the feedback information shows physical discomfort, the context application module will remind users to take medicine or suggest users to seek medical treatment in time.

S43: The knowledge base stores user feedback information, and adjusts its own stored context information based on feedback information, and then sends this information to the context information acquisition and modeling module, the original context information detection module, the adaptive management module, the uncertainty elimination module, the fusion and reasoning module and the context subscription unit.

S44: The context information acquisition and modeling module, the original context information detection module, the adaptive management module, the uncertainty elimination module, the fusion and reasoning module and the context application layer adjustment module appropriately adjust their preset information and related operations respectively according to the context information from the knowledge base; for example, context information collection threshold, context modeling methods, original context information discarding threshold, adaptive management algorithms, uncertainty elimination algorithms, fusion and reasoning strategies and context subscription methods, etc.

(5) The adaptive management subsystem comprises the following steps:

S51: The adaptive management module receives information related to the quality of information from the original context information detection module. For example, the quality information such as incompleteness rate, inaccuracy rate, inconsistency rate, membership degree and accuracy of context information.

S52: The adaptive management module analyzes the quality information of context from the original context information detection module and transmits the analysis results to the uncertainty elimination module, and the main content of the analyses contains the priority of uncertainty elimination and which algorithms to use in an uncertain situation.

S53: The context information after a series of processing is stored in the knowledge base which also comprises user feedback information and context subscription information. The quality information of context information in the knowledge base will be fed back to the adaptive management module.

S54: After the further adjustment of knowledge base feedback information, the adaptive management module will make adjustments to the threshold information of the original context information detection module, processing mechanism and algorithm selection of the uncertainty elimination module.

The step S54 comprises the following steps: when the quality of context information still fails to meet the system requirements after a series of processing, the knowledge base sends adjustment information to the adaptive management module, and the adaptive management module will make adjustments according to the current quality of information and the feedback information from the knowledge base.

Figure 3:
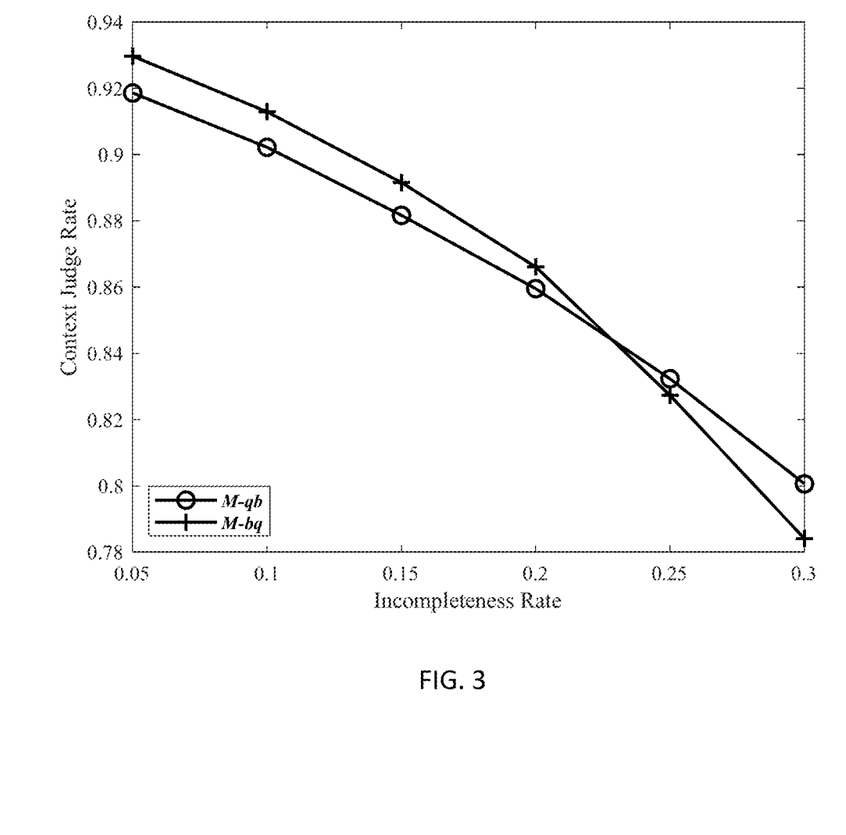
FIG. 3 is a simulation diagram of system's fault tolerance performance, i.e., a simulation diagram of the logical relationship between incompleteness elimination and inconsistency elimination.

FIG. 3 is a simulation diagram of the fault tolerance of the system proposed by the present invention, i.e., a simulation diagram of the logical relationship between incompleteness elimination and inconsistency elimination. In the context information uncertainty elimination system, when various uncertainty factors coexist, determine which uncertainty factor is eliminated firstly, so that the system has a higher context judge rate and better fault tolerance. The present invention proposes a context information uncertainty elimination mechanism that firstly eliminates the more serious uncertainty factor, and then eliminates the second one, while taking into account special circumstances. An experimental simulation is conducted to verify the present invention as follows.

The experimental simulation uses four sensors. The incompleteness rate of the context information is set to be variable, which changes to 0.05, 0.10, 0.15, 0.20, 0.25, 0.30, successively, and the inconsistency rates of the four sensors are: 0.04, 0.08, 0.15, 0.20; respectively. The trustworthiness-based algorithm is used to eliminate the incompleteness, and the voting algorithm is used to eliminate the inconsistency. FIG. 3 is a simulation diagram of the logical relationship between incompleteness elimination and inconsistency elimination, where M-qb is to eliminate the incompleteness firstly, and M-bq is to eliminate the inconsistency firstly.

As shown in FIG. 3, assuming that the inaccuracy rate of context information is a fixed value, the horizontal axis is the incompleteness rate of context information, and the vertical axis is the context judge rate of the uncertainty elimination algorithm. The two curves in FIG. 3 are the context judge rate of the uncertainty elimination algorithm when the elimination order of uncertainty factors is different. It can be seen that when the incompleteness rate is 0.205, the two curves intersect at one point, that is, the context judge rates of the two processing algorithms are equal (the position of the intersection is not only related to precision of the sensors, but also related to the number of missing context sources at the same time; when the incompleteness rate is less than 0.205, the context judge rate of the algorithm that eliminates the inconsistency firstly is higher, while when the incompleteness rate is greater than 0.205, the algorithm that eliminates the incompleteness firstly has a higher context judge rate. In addition, under the condition that the context judge rate set by the system is 0.90, choosing a suitable context information uncertainty elimination mechanism can eliminate a larger range of context information incompleteness. From the (0.10, 0.90) point and (0.12, 0.90) point in FIG. 3, we can see that the range of incompleteness that the system can eliminate has increased from 0.10 to 0.12.

What is claimed is:

1. A context information uncertainty elimination system based on (Quality of comprehensive index) QoX adaptive management in heterogeneous context-aware networks, which comprises a sensor module, a context information acquisition and modeling module, a context threshold information preset module, an original context information detection module, an adaptive management module, an uncertainty elimination module, a context information correlation analysis module, an original context information flow reconstruction module, a composite context information flow module, a fusion and reasoning module, a context application layer adjustment module and a knowledge base;

wherein the sensor module, the context information acquisition and modeling module, the original context information detection module, the adaptive management module, the uncertainty elimination module, the context information correlation analysis module, the composite context information flow module, the fusion and reasoning module, the knowledge base and the context application layer adjustment module are connected in turn; the context threshold information preset module, the original context information detection module and the adaptive management module are sequentially connected from beginning to end; the adaptive management module, the uncertainty elimination module, the original context information flow reconstruction module and the composite context information flow module are connected in turn from beginning to end; the knowledge base is connected to the context application layer adjustment module;

the sensor module is related to Quality of Device (QoD) and utilized to collect context information;

the context information acquisition and modeling module is utilized to acquire context information and model the acquired context information according to the preset initial modeling method for obtaining original context information, and this module is related to the QoD;

the original context information detection module detects and quantifies the uncertainty of context information by calculating Quality of Context (QoC) indexes such as inconsistency rate, incompleteness rate, inaccuracy rate and timeliness, and combines the acceptance and rejection QoC threshold information preset by system to obtain the original context information flow that meets the requirements of system's accuracy rate and QoC indexes such as inconsistency rate, incompleteness rate, inaccuracy rate and timeliness; this module is related to the QoC;

the adaptive management module combines quality indexes of original context information, degree of relevance and feedback information of context information to evaluate the elimination priority level of each uncertainty factor of context information, and adaptively selects different elimination algorithms for a certain uncertainty problem in different situations, where quality indexes of original context information refer to inconsistency rate, incompleteness rate, inaccuracy rate and timeliness of the context information transmitted from the original context information detection module; degree of relevance refers to the correlation between the context information collected by each sensor in the sensor module and final judgment results; feedback information of context information comprises the user feedback information and the context information after context subscription and error correction; for the elimination priority level of uncertainty factors, the adopted principle is firstly to eliminate main contradiction, consider special circumstances into consideration and adopt a real-time feedback mechanism, this module is related to the QoX;

the uncertainty elimination module analyzes original context information and eliminates uncertain data of original context information, this module is related to the QoX;

the knowledge base is related to the QoX used to store the context information after fusion and reasoning, the information after context subscription information correction and user feedback information; meanwhile, the knowledge base provides context information modeling methods for the context information acquisition and modeling module, and adjusts context information acquisition threshold at the same time; it also provides feedback information and degree of relevance information between context information for the adaptive management module, and provides suitable fusion and reasoning mechanisms for the fusion and reasoning module;

the fusion and reasoning module is utilized to combine the data processed by the uncertainty elimination module, complete information flow reconstruction of original context information, analyze the correlation of context information and finally build information flow of compound context information with accurate data, clear structure and rich meaning; information flow of compound context information is fused and reasoned into the high-level context information that can be recognized by applications and smart devices through utilizing context information fusion and reasoning technologies, and then the high-level context information will be stored in the knowledge base; applications and smart devices make adaptive adjustments according to the high-level context information, this module is related to Quality of Service (QoS);

the context application layer adjustment module is used to adjust the operating statuses of programs or devices in real time according to user feedback or context subscription, and to update the historical context information in the knowledge base, this module is related to the QoS;

the context threshold information preset module is related to the QoC and utilized to preset the discarding threshold of context information;

the context information correlation analysis module is used to analyze the degree of relevance between context information;

the original context information flow reconstruction module is used to reintegrate original context information flow;

the compound context information flow module is utilized to reorganize context information based on the degree of relevance between context information, as well as the original context information after reconstruction.

2. The context information uncertainty elimination system based on QoX adaptive management in heterogeneous context-aware networks according to claim 1, wherein the preset initial modeling method is "context-aware type+context-aware information+context-aware accuracy", context-aware type is used for information classification, context-aware information refers to the original context information collected by sensors and context-aware accuracy is used for information processing.

3. The context information uncertainty elimination system based on QoX adaptive management in heterogeneous context-aware networks according to claim 1, wherein the context information uncertainty elimination system further comprises a transmission control module, a priority control module, an adaptive control module and a system access control module;

the transmission control module is used to control the flow direction of original context information and quality of context information, this module is related to the QoC; the priority control module is related to the QoX and used to control the priority for the elimination of various context information uncertainty problems; the adaptive control module is related to the QoX and utilized to adjust context information uncertainty elimination mechanism in real time; the system access control module is related to the QoS and used to control users' access range.

4. The context information uncertainty elimination system based on QoX adaptive management in heterogeneous context-aware networks according to claim 1, wherein the original context information detection module comprises a context information inconsistency detection/quantization unit, a context information inaccuracy detection/quantization unit and a context information incompleteness detection/quantization unit;

the context information inconsistency detection/quantification unit is used to detect inconsistency and determine inconsistency rate; the context information inaccuracy detection/quantization unit is used to detect inaccuracy and determine inaccuracy rate; the context information incompleteness detection/quantification unit is utilized to detect incompleteness of context information and determine incompleteness rate.

5. The context information uncertainty elimination system based on QoX adaptive management in heterogeneous context-aware networks according to claim 1, wherein the uncertainty elimination module comprises an inconsistency elimination unit, an incompleteness elimination unit and an inaccuracy elimination unit;

the inconsistency elimination unit eliminates inconsistency of context information according to the algorithms given by the adaptive management module; the incompleteness elimination unit eliminates incompleteness of context information according to the algorithms given by the adaptive management module; the inaccuracy elimination unit eliminates inaccuracy of context information according to the algorithms given by the adaptive management module.

6. The context information uncertainty elimination system based on QoX adaptive management in heterogeneous context-aware networks according to claim 1, wherein the adaptive management module comprises a credibility reliability unit, a degree of relevance evaluation unit, an incompleteness rate at the same time unit and an uncertainty level unit;

the credibility reliability unit is utilized to calculate the credibility and reliability of context information; the degree of relevance evaluation unit is utilized to evaluate the degree of relevance between context information and context information, as well as which between context information and final judgment results; the incompleteness rate at the same time unit is utilized to judge the magnitude of incompleteness rate, inconsistency rate and inaccuracy rate of context information at the same time; the uncertainty level unit is utilized to evaluate the severity of uncertainty problems of various context information based on above indexes.

7. The context information uncertainty elimination system based on QoX adaptive management in heterogeneous context-aware networks according to claim 1, wherein the context application layer adjustment module comprises a user feedback unit, a context application unit, a context subscription unit and an error correction unit;

the knowledge base, the context application unit, the context subscription unit and the error correction unit are connected in turn from beginning to end; the user feedback unit is connected to the knowledge base; the user feedback unit is used to store user feedback information; the context application unit is used to control the operating statuses of applications or devices; the context subscription unit is used to subscribe required context information based on users' current statuses; the error correction unit is used to correct historical context information in the knowledge base based on subscription context information.

8. The context information uncertainty elimination system based on QoX adaptive management in heterogeneous context-aware networks according to claim 7 comprises the following steps:

(1) Initial setting subsystem is responsible for setting initial parameters of the context information uncertainty elimination system, and the steps are as follows:

S11: through the user feedback unit, users perform initial setting operations of the context-aware system based on the types, quantities and structures of the collected context information, and the initial setting information is sent to the knowledge base; the initial setting information contains context information modeling method, context information discarding threshold, uncertainty elimination priority level, uncertainty elimination algorithms and context information fusion and reasoning rules;

S12: the knowledge base stores users' initial setting information for the context-aware system in the user feedback unit as well as the useful historical information, and sends relevant information to the context information acquisition and modeling module, the original context information detection module, the adaptive management module, the uncertainty elimination module and the fusion and reasoning module;

S13: the context information acquisition and modeling module, the original context information detection module, the adaptive management module, the uncertainty elimination module and the fusion and reasoning module adjust their operations based on the relevant information obtained from the knowledge base;

(2) The context triggering subsystem comprises the following steps:

S21: the context information acquisition and modeling module obtains context information, models according to the preset context information modeling method, and sends it to the original context information detection module;

further preferably, the context information acquisition and modeling module obtains context information, if context information exceeds the context information discarding threshold, it will be discarded, otherwise, it will be modeled based on the preset context information modeling method and then sent to the original context information detection module, the modeling method is "context-aware type+context-aware information+context-aware accuracy";

S22: the original context information detection module detects whether the context information from the context information acquisition and modeling module has incompleteness, inaccuracy and inconsistency, calculates incompleteness rate, inaccuracy rate, inconsistency rate, degree of relevance, timeliness and reliability, respectively, and filters based on the context information discarding threshold preset by users in the knowledge base; the context information which meets requirements is transmitted to the uncertainty elimination module; the quality of context information is transmitted to the adaptive management module at the same time, which contains inconsistency rate, incompleteness rate, inaccuracy rate and degree of relevance;

S23: the adaptive management module further formulates context information uncertainty elimination strategy based on the quality of context information from the original context information detection module, the context information uncertainty elimination strategy comprises which uncertainty factor is eliminated firstly and which algorithms are utilized to eliminate each uncertainty factor;

S24: based on the context information from the original context information detection module and the uncertainty elimination strategy from the adaptive management module, the uncertainty elimination module eliminates the uncertainty of context information;

S25: through the fusion and reasoning module, low-level context information and useful historical context information in the knowledge base are fused and reasoned into the high-level context information that can be recognized by the context application layer adjustment module, which is stored in the knowledge base as well;

S26: the knowledge base stores real-time data and the high-level context information reasoned by the fusion and reasoning module;

S27: the context application layer adjustment module makes appropriate responses based on the user feedback information and various context information from the knowledge base;

(3) the context subscription subsystem is responsible for completing tasks of context information subscription in the context-aware system; the steps are as follows:

S31: starting from the requirements of context-aware applications, the context subscription unit sets up required context subscription mechanism and sends subscribed context information to the error correction unit;

S32: the error correction unit obtains correct context information based on the comparative analyses between received context subscription unit and corresponding part of context information in the knowledge base, and converts correct context information into a format that can be recognized by the knowledge base and transmits it to the knowledge base;

S33: the knowledge base adjusts the corresponding context information in the knowledge base based on the context subscription information sent by the error correction unit, and sends the adjustment information to the context information acquisition and modeling module to adjust and correct relevant context information periodically;

S34: the context application unit further adjusts its operations according to context subscription information;

S35: the context information acquisition and modeling module, the original context information detection module, the adaptive management module, the uncertainty elimination module, the fusion and reasoning module and the context application layer adjustment module adjust their operations according to the relevant adjustment information in the knowledge base;

(4) the user feedback subsystem is responsible for completing adjustment tasks of user feedback in the context-aware system; the steps are as follows:

S41: the user feedback unit receives user feedback information and adjustment information;

S42: the context application unit adjusts its own tasks according to the feedback information from the user feedback unit, and adjusts the operations that cannot meet the users' expectation;

S43: the knowledge base stores user feedback information, and adjusts its own stored context information based on feedback information, and then sends this information to the context information acquisition and modeling module, the original context information detection module, the adaptive management module, the uncertainty elimination module, the fusion and reasoning module and the context subscription unit;

S44: the context information acquisition and modeling module, the original context information detection module, the adaptive management module, the uncertainty elimination module, the fusion and reasoning module and the context application layer adjustment module appropriately adjust their preset information and related operations respectively according to the context information from the knowledge base;

(5) the adaptive management subsystem comprises the following steps:

S51: the adaptive management module receives information related to the quality of information from the original context information detection module;

S52: the adaptive management module analyzes the quality information of context from the original context information detection module and transmits the analysis results to the uncertainty elimination module, and the main content of the analyses contains the priority of uncertainty elimination and which algorithms to use in an uncertain situation;

S53: the context information after a series of processing is stored in the knowledge base which also comprises user feedback information and context subscription information; the quality information of context information in the knowledge base will be fed back to the adaptive management module;

S54: after the further adjustment of knowledge base feedback information, the adaptive management module will make adjustments to the threshold information of the original context information detection module, processing mechanism and algorithm selection of the uncertainty elimination module;

it is further preferred that the context information uncertainty elimination strategy is firstly eliminating main contradiction, and secondly eliminating secondary contradiction.

9. The context information uncertainty elimination system based on QoX adaptive management in heterogeneous context-aware networks according to claim 8, wherein when inconsistency of context information is eliminated, the voting algorithm, the trustworthiness-based algorithm and the D-S evidence theory algorithm are adopted; when incompleteness of context information is eliminated, the mean and EM algorithm is adopted.

10. The context information uncertainty elimination system based on QoX adaptive management in heterogeneous context-aware networks according to claim 8, the step S54 comprises the following steps: when the quality of context information still fails to meet the system requirements after a series of processing, the knowledge base sends adjustment information to the adaptive management module, and the adaptive management module will make adjustments according to the current quality of information and the feedback information from the knowledge base.

* * * * *